United States Patent
Zolnowski et al.

(10) Patent No.: US 12,169,080 B2
(45) Date of Patent: Dec. 17, 2024

(54) MULTI-FOCAL POINT SOLAR REFRACTION HEATING

(71) Applicant: The Boeing Company, Chicago, IL (US)

(72) Inventors: Michael R. Zolnowski, St. Louis, MO (US); David P. Heck, St. Charles, MO (US)

(73) Assignee: The Boeing Company, Arlington, VA (US)

( * ) Notice: Subject to any disclaimer, the term of this patent is extended or adjusted under 35 U.S.C. 154(b) by 695 days.

(21) Appl. No.: 16/716,092

(22) Filed: Dec. 16, 2019

(65) Prior Publication Data
US 2021/0180830 A1     Jun. 17, 2021

(51) Int. Cl.
F24S 23/30      (2018.01)
F24S 20/20      (2018.01)
F24S 20/30      (2018.01)
H02S 40/22      (2014.01)

(52) U.S. Cl.
CPC ............. *F24S 23/31* (2018.05); *F24S 20/30* (2018.05); *H02S 40/22* (2014.12); *F24S 2020/23* (2018.05)

(58) Field of Classification Search
None
See application file for complete search history.

(56) References Cited

U.S. PATENT DOCUMENTS

| | | | | |
|---|---|---|---|---|
| 4,134,393 A | * | 1/1979 | Stark | C02F 1/14 126/714 |
| 4,194,949 A | | 3/1980 | Stark | |
| 4,238,246 A | * | 12/1980 | Genequand | F24S 23/77 136/246 |
| 4,249,516 A | * | 2/1981 | Stark | F24S 23/12 136/246 |

(Continued)

FOREIGN PATENT DOCUMENTS

| | | |
|---|---|---|
| AU | 6852881 A | 3/1981 |
| CN | 104583686 A | 4/2015 |

(Continued)

OTHER PUBLICATIONS

European Patent Office, Extended European Search Report Issued in Application No. 16173996.6, Dec. 2, 2016, Germany, 8 pages.

(Continued)

*Primary Examiner* — Edelmira Bosques
*Assistant Examiner* — Deepak A Deean
(74) *Attorney, Agent, or Firm* — Alleman Hall & Tuttle LLP

(57) ABSTRACT

Examples are provided herein that relate to solar heating with a solar refraction device. One example provides a solar heating system, comprising a container configured to enclose contents within the container in a closed configuration, and a solar refraction device comprising a lens array assembly having a plurality of lens array sub-assemblies, the lens array assembly configured to refract solar energy impinging on the lens array assembly to focus refracted solar (Continued)

energy at a plurality of focal points positioned to heat the contents enclosed within the container, each focal point corresponding to a corresponding lens array sub-assembly of the plurality of lens array sub-assemblies.

20 Claims, 14 Drawing Sheets

(56) References Cited

U.S. PATENT DOCUMENTS

| | | | | |
|---|---|---|---|---|
| 4,307,711 | A * | 12/1981 | Doundoulakis | H01L 31/0547 126/677 |
| 4,520,794 | A * | 6/1985 | Stark | F24S 30/425 126/684 |
| 4,653,472 | A * | 3/1987 | Mori | G02B 6/0006 136/246 |
| 5,489,002 | A | 2/1996 | Streiff | |
| 7,797,939 | B2 * | 9/2010 | Green | F24S 23/79 60/641.14 |
| 8,000,018 | B2 * | 8/2011 | Benitez | F24S 23/31 359/743 |
| 8,689,784 | B2 * | 4/2014 | Monsebroten | F21S 11/00 126/684 |
| 8,854,794 | B2 | 10/2014 | Van Straten | |
| 10,422,553 | B2 | 9/2019 | Heck et al. | |
| 10,508,832 | B2 | 12/2019 | Faidi | |
| 2005/0218657 | A1 | 10/2005 | Weesner et al. | |
| 2008/0092877 | A1 * | 4/2008 | Monsebroten | F24S 23/10 126/683 |
| 2008/0115830 | A1 | 5/2008 | Shin et al. | |
| 2009/0185302 | A1 * | 7/2009 | Forrester | F24S 23/31 359/853 |
| 2009/0194097 | A1 | 8/2009 | Rabinoff | |
| 2009/0277495 | A1 | 11/2009 | Talaba et al. | |
| 2010/0024801 | A1 | 2/2010 | Lin | |
| 2010/0123954 | A1 * | 5/2010 | Benitez | G02B 19/0042 359/743 |
| 2011/0193512 | A1 * | 8/2011 | Singhal | F03D 9/11 290/55 |
| 2011/0230573 | A1 * | 9/2011 | McAlister | B01J 8/0496 422/105 |
| 2012/0048261 | A1 * | 3/2012 | Kuntze | H01L 31/0543 126/696 |
| 2012/0260906 | A1 * | 10/2012 | Baeten | F24S 23/30 126/600 |
| 2013/0139808 | A1 | 6/2013 | Lin et al. | |
| 2013/0167832 | A1 | 7/2013 | Kim | |
| 2013/0175420 | A1 | 7/2013 | Dror | |
| 2013/0255256 | A1 | 10/2013 | Logothetis | |
| 2013/0309164 | A1 * | 11/2013 | McAlister | F23G 7/00 422/107 |
| 2014/0014159 | A1 | 1/2014 | Polk | |
| 2014/0326235 | A1 * | 11/2014 | Klein | F24S 10/70 126/651 |
| 2017/0051947 | A1 * | 2/2017 | Heck | F03G 6/06 |
| 2019/0346177 | A1 * | 11/2019 | Jafarian | C01B 3/042 |
| 2021/0180830 | A1 | 6/2021 | Zolnowski et al. | |

FOREIGN PATENT DOCUMENTS

| | | |
|---|---|---|
| GB | 1585916 A | 3/1981 |
| JP | H1126800 A | 1/1999 |
| WO | 2013180344 A1 | 12/2013 |

OTHER PUBLICATIONS

United States Patent and Trademark Office, Office Action Issued in U.S. Appl. No. 16/716,129, May 4, 2022, 25 pages.
Calver, W., U.S. Pat. No. 260,657A, Issued Jul. 4, 1882. (Submitted as NPL, as form does not allow for six digits.).
Calver, W., U.S. Pat. No. 603,317A, Issued May 3, 1898. (Submitted as NPL, as form does not allow for six digits.).
"Solar Panel Experiment Using Fresnel Lens!," YouTube Website, Available Online at www.youtube.com/watch?v=B16hHEaWwpl, Nov. 28, 2019, 1 page.
"Fresnel Lens Solar Power Foundry Obsidian Farm 3800," YouTube Website, Available Online at www.youtube.com/watch?v=drE54ctrHBY, May 16, 2013, 3 pages.
United States Patent and Trademark Office, Office Action Issued in U.S. Appl. No. 16/716,129, Sep. 15, 2022, 25 pages.

* cited by examiner

MULTI-FOCAL POINT SOLAR REFRACTION HEATING

FIELD

The present disclosure is generally related to solar systems, and in particular, to solar systems used to heat materials.

BACKGROUND

There is a need to improve the energy efficiency associated with heating materials at industrial volumes. For example, at present in the United States ("US"), melting industrial materials entails a large quantity of energy with aluminum fabrication alone accounting for about 30% of that energy consumption. An even greater amount of energy is required when recycled steel is added. As such, major US industries, especially those industries related to metal recycling and stock material fabrication, occupy a major portion of the nation's total energy consumption. Therefore, for nearly every industry involved in the process of fabrication or recycling of existing materials, there is a need for high amounts of energy to melt materials, heat the materials, or for other key stage, or stages, of the process.

In general, the two major problems with conventional heating (e.g., known furnaces (also known as burners) utilize gas, induction, blast, and electric arc furnaces ("EAFs")) are their dependence on limited and fossil fuels (e.g., coal, oil, and natural gas), as well as the inefficiencies in how they transfer the generated thermal energy to heat a material. It is appreciated by those of ordinary skill in the art that these types of furnaces have significant energy losses during the thermal energy transfer process (i.e., the process of heating the furnace and then utilizing that heat to melt or heat the material), which ultimately results in about 30 to 40% efficiency. This results generally because large amounts of energy input into a furnace does not directly translate to thermal energy. As an example, a blast furnace requires massive quantities of input energy to raise its temperature to its operating temperature. In aluminum melting, for example, only about 40% of the energy utilized by the furnace goes to actually melting the aluminum.

This problem is also similar for furnaces utilizing induction melting, which is done typically open to air. Electrical resistance furnaces ("ERTs") that utilize the principle of indirect heating are capable of utilizing about 40% of their input energy for melting but in practice are only typically about 26% efficient because ERT furnaces typically experience other energy losses that include heating the air and then losing hot air through ventilation conduction to the insulating liner of the furnace and losses of energy when opening the ERT furnace. As a result, EAF furnaces require large quantities of electrical power and can have adverse environmental effects. Additionally, in many EAF furnaces, additional gas burners are typically utilized to assist in heating scrap metal to a temperature where the metal conducts electricity efficiently so as to allow the EAF furnace to run properly. Moreover, another major issue with these types of furnaces is the large carbon cost of the process due to the amount of carbon dioxide output by these systems. Unfortunately, their continued use is largely due to the relatively cheap cost of current sources of fuel.

Known uses of solar energy are not capable of addressing or solving these problems because known solar technologies are limited in their capacity, window of operation, and overall efficiency when capturing solar energy and transferring it into a usable fashion. Specifically, known solar systems have a number of inefficiencies in how they utilize solar energy to either heat an object or generate electricity. These solar cells placed on solar panels utilize photovoltaic cells to convert solar energy impinging on the solar cell into electricity. Common modernly used crystalline silicon solar cells output on average about 18% energy conversion due to losses of heat and the electricity transfer within the solar cells.

In addition to solar cells, modern solar systems also include systems that heat objects, such as water pipes for example, that transfer the resulting heat energy to other objects for heating those objects or generating electricity through movement of, for example, water through the pipes to a turbine. Moreover, another problem with solar energy is that it is not concentrated enough in any given area to use on an industrial scale or it requires a system in place to utilize the energy in a process which converts it to useable electricity.

Attempts to solve these problems have included using solar reflector systems to attempt to reflect and focus energy into a small area that can either generate power with a solar cell, heat water to generate electricity through a turbine, or heat a small crucible containing some material in a small furnace. However, even with the use of reflectors, the resulting systems still do not have high efficiency. Systems that utilize solar cells still only have limited efficiency (e.g., 18% efficiency). Systems that heat water still have the same thermal loses as the non-reflector solar heating systems. Additionally, furnaces lose energy from having to heat a crucible. Moreover, all of these solar reflector systems lose energy from transferring energy to additional components in the system and from reflection angle losses. Furthermore, some of these systems are stationary in a way that does not allow them to follow the Sun and, therefore, limits the amount of time that they can operate.

As such, there is a need for a solar energy capture system that is capable of producing a sufficient amount of energy for use in modern industrial processes that include heating or melting of industrial materials.

SUMMARY

In one example, a solar heating system includes a container configured to enclose contents, and a solar refraction device comprising a lens array assembly having a plurality of lens array sub-assemblies. The lens array assembly is configured to refract solar energy impinging on the lens array assembly to focus refracted solar energy at a plurality of focal points. Each focal point corresponds to a corresponding lens array sub-assembly of the plurality of lens array sub-assemblies. The focal points are positioned to heat the contents enclosed within the container. In embodiments, the container is in a closed configuration. In another embodiment, the container encloses contents that are in another enclosed container.

The use of the phrase "in a closed configuration" hereinafter refers to the container that is being heated being partially or fully closed itself, or the container being open, partially closed or closed and the contents inside being enclosed in another container, object, housing or the like.

Another example provides a method for heating a container enclosing contents using a solar refraction device, wherein the container itself is either closed, (e.g., partially closed or fully closed) or wherein the contents of the container are enclosed in another container, housing, object or the like. The method includes refracting solar energy impinging on a lens array assembly of the solar refraction device, the lens array assembly having a plurality of lens array sub-assemblies. The method includes focusing the refracted solar energy at a plurality of focal points to heat the contents enclosed within the container. Each focal point corresponds to a corresponding lens array sub-assembly of the plurality of lens array sub-assemblies.

In another example, a solar heating system includes an enclosed pipe, and a solar refraction device. The solar refraction device comprises a lens array assembly having a plurality of lens array sub-assemblies. The lens array assembly is configured to refract solar energy impinging on the lens array assembly to focus refracted solar energy at a plurality of focal points to heat a fluid enclosed in the pipe. Each focal point corresponds to a corresponding lens array sub-assembly of the plurality of lens array sub-assemblies.

DETAILED DESCRIPTION

Figure 1:
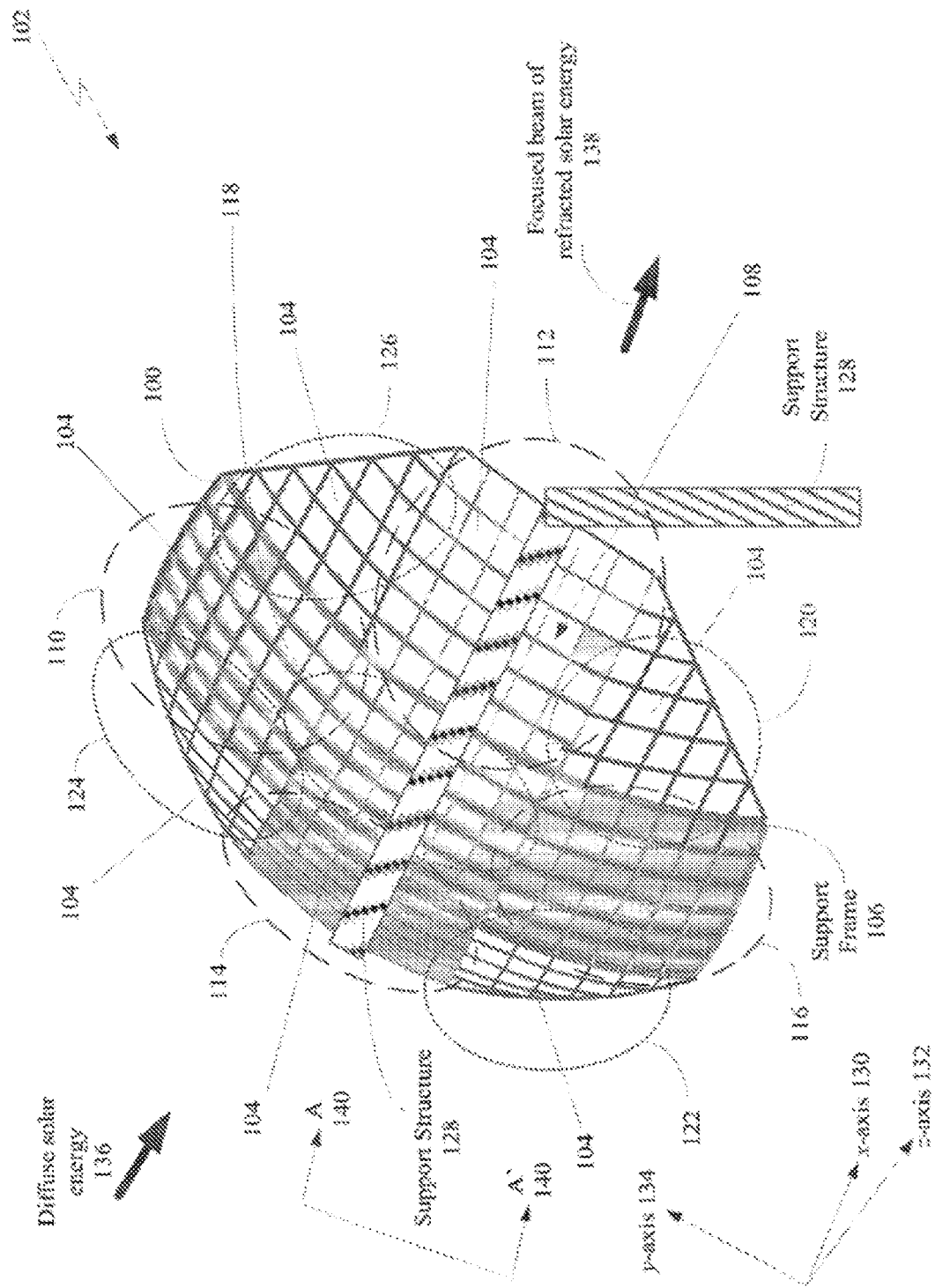
FIG. 1 is a perspective back-view of an example of an implementation of a lens array assembly of a solar refraction device in accordance with the present disclosure.

A solar refraction device (SRD) disclosed herein comprises a lens array assembly having a plurality of lens array sub-assemblies. The lens array assembly is configured to refract solar energy impinging on the lens array assembly to focus refracted solar energy at a plurality of focal points. Each focal point corresponds to a corresponding lens array sub-assembly of the lens array assembly. The plurality of focal points of the SRD can be positioned to heat objects using the refracted solar energy. The act of heating an object includes increasing its temperature and/or changing its phase in various examples. Objects heated by an SRD can include materials in various forms as well as containers that partially or fully enclose the materials.

In one example, an SRD is provided for heating materials in a closed container using diffuse solar energy that impinges on an outside surface of the SRD and is refracted through the SRD. The SRD includes a lens array assembly and a plurality of lens panes attached to the lens array assembly. The lens array assembly includes an outside surface corresponding to the outside surface of the SRD, an inside surface, and a plurality of lens array sub-assemblies. A sub-plurality of lens panes of the plurality of lens panes are attached to a corresponding lens array sub-assembly of the plurality of lens array sub-assemblies. In an example, each lens array sub-assembly has a convex shape and has a focal length corresponding to the lens array sub-assembly which results in the lens array assembly having a plurality of focal lengths.

As an example of operation in accordance with the present disclosure, the SRD is configured to perform a method that includes refracting impinging solar energy (i.e., the solar energy that directly strikes and/or illuminates the SRD which may diffuse (i.e., spread) along an outer surface of the SRD) on the SRD through the lens array assembly having the plurality of lens array sub-assemblies. The refracted solar energy is then focused onto a plurality of focal points, where each focal point corresponds to a lens array sub-assembly of the plurality of lens array sub-assemblies. A heating area is defined by the plurality of focal points with respect to an object to be heated. For example, the heating area can be defined upon an external surface of materials to be heated or upon an external surface of a container that encloses materials to be heated. The object is then heated at the heating area utilizing the focused refracted solar energy.

Also disclosed is a method for fabricating the SRD in accordance with the present disclosure. The method includes determining the type and amount of heat needed to provide a temperature increase and/or phase change with respect to one or more materials and determining an amount of energy needed provide that amount of heat to the materials. An array size of a lens array assembly is then determined for producing the previously determined amount of energy, where the lens array assembly is configured to refract solar light impinging on the lens array assembly to the materials and/or a container holding the materials. The method then includes determining a focal length of the lens array assembly, assembling a support frame to support the lens array assembly, and assembling the lens array assembly.

In this disclosure, materials heated by an SRD can include any type of material or combination of materials in solid, liquid, and/or gas forms. While liquids and gases are examples of fluids, such materials can include granulated solids that can be conveyed and/or mixed in a manner similar to a fluid. Examples of materials that can be heated include working fluids (e.g., water within heat exchangers, heat engines, vapor cycles, and other thermodynamic systems), industrial materials, such as metallic industrial materials including aluminum, steel, iron or other metals or alloys, non-metallic industrial materials such as plastics or other recyclable non-metals, chemicals, such as chemical reactants and chemical products (e.g., in a chemical processing system), foods, seeds, soil, crushed stone, sand, animal waste, compost, lumber, and other forms of organic matter.

In FIG. 1, a perspective back-view of an example of an implementation of a lens array assembly 100 of an SRD 102 is shown in accordance with the present disclosure. SRD 102 includes the lens array assembly 100 and a plurality of lens panes 104 attached to the lens array assembly 100. In this example, the lens array assembly 100 can include a support frame 106 constructed of a rigid material such as, for example, a metal such as steel or aluminum or other rigid non-metallic materials (e.g., wood or composites). The support frame 106 can include a plurality of openings that are configured to accept the plurality of lens panes 104, which are each configured to be attached to the lens array assembly 100. The support frame 106 is constructed of a rigid material that is strong enough to support the weight of, and stresses caused by, the plurality of lens panes 104 placed within the plurality of opening in the support frame 106 and capable of withstanding prolonged exposure in the environment to things such as, for example, electromagnetic radiation, thermal heat, and ultraviolent radiation without significantly degrading or warping. The lens array assembly 100 includes an outside surface 108 that also corresponds to the outside surface of SRD 102, an inside surface (not shown), and a plurality of lens array sub-assemblies. In at least some examples, each lens array sub-assembly is a discrete panel of the lens array assembly 100. However, two or more lens array sub-assemblies can be integrated into a common panel in another example.

In this example, the lens array assembly 100 is shown having nine (9) lens array sub-assemblies 110, 112, 114, 116, 118, 120, 122, 124, and 126. Each lens array sub-assembly is shown having a sub-plurality of lens panes (from the total plurality of lens panes 104) attached to the corresponding lens array sub-assembly. As an example, part of a support structure 128 is also shown attached to one side of the lens array assembly 100. The support structure 128 can be attached to the support frame 106 in a way that allows the support structure 128 to maintain the lens array assembly 100 at a predetermined distance from an object to be heated (e.g., a heating container or materials contained therein) where the predetermined distance is a distance that is based on the multiple focal lengths of the lens array assembly 100 (described in more detail later). The support structure 128 can be connected to, or part of, a solar tracker (not shown), where the solar tracker is configured to move the support structure 128 (and the as the lens array assembly 100) in a manner that maintains a high amount of solar energy being refracted through SRD 102 and focused at a heating area. In this disclosure, a "high" amount of solar energy is considered enough solar energy for SRD 102 to operate according to the present description. Similar to the support frame 106, the support structure 128 can be constructed of a rigid material that is strong enough to support the weight of, and stresses caused by, the lens array assembly 100. Support frame 106 can include metallic and non-metallic rigid materials. Furthermore, in this example, the lens array assembly 100 is shown to have a three-dimensional convex shape with each corresponding lens array sub-assemblies 110, 112, 114, 116, 118, 120, 122, 124, and 126 also being convex. In an example, the convex shape is approximately parabolic along the x-axis 130 and z-axis 132 and also along the y-axis 134 and z-axis 132. In an example of operation, SRD 102 refracts diffuse solar energy 136 (i.e., the impinging solar energy) that impinges on the outside surface 108 (of both SRD 102 and lens array assembly 100) through SRD 102 resulting in a focused beam of refracted solar energy 138 that is focused in a direction along the z-axis 132 away from the inside surface of the lens array assembly 100.

In this example, it is appreciated by those of ordinary skill in the art that only nine (9) lens array sub-assemblies 110, 112, 114, 116, 118, 120, 122, 124, and 126 have been shown in FIG. 1 for purpose of illustration. However, the lens array assembly 100 can include more or less lens array sub-assemblies based on design and application of SRD 102. As will be described later, in general each lens array sub-assembly will produce a corresponding focused beam of refracted solar energy that will have a focal length that corresponds to the specific lens array sub-assembly. The resulting focal lengths from the different lens array sub-assemblies can be different from each other so that the combined focused beams of refracted solar energy (for each lens array sub-assembly) combines to form the focused beam of refracted solar energy 138 that produces a heating area (described later) that is located at a distance from the SRD. In at least some examples, this heating area is distributed over a region of an object to heated, rather than being focused at a same location.

Figure 13:
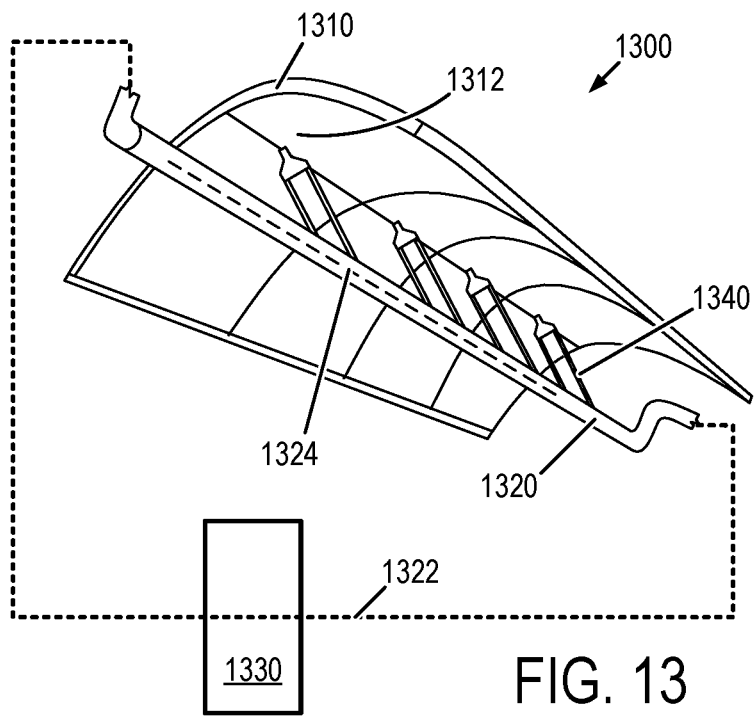
FIG. 13 shows an example system 1300 including a solar refraction device utilized for heating the contents of a pipe.
Figure 14:
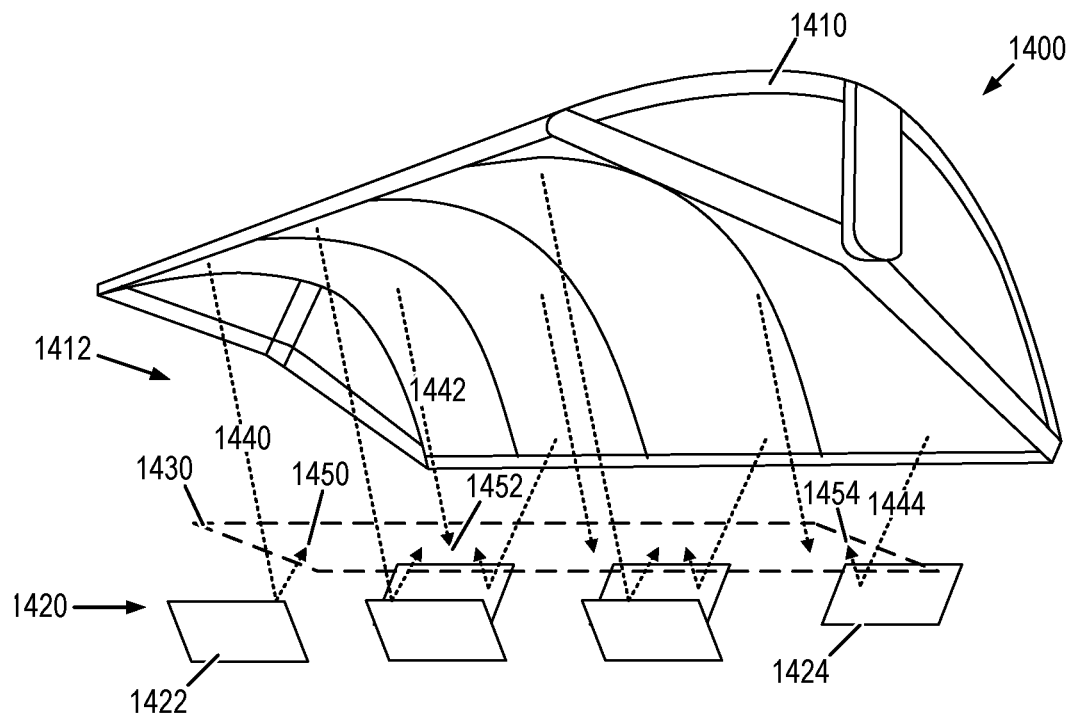
FIG. 14 shows an example solar refraction device forming a canopy, and a plurality of reflectors to reflect light that passes through the solar refraction device.

From the detail in FIG. 1, in this example, SRD 102 is shown to have an octagon two-dimensional convex shaped lens array assembly 100. Additionally, the lens array assembly 100 is shown to have five (5) rectangular shaped two-dimensional convex lens array sub-assemblies 110, 112, 114, 116, and 118 and four (4) triangular shaped two-dimensional convex lens array sub-assemblies 120, 122, 124, and 126. Moreover, each rectangular shaped two-dimensional convex lens array sub-assemblies 110, 112, 114, 116, and 118 is shown to have 8 by 8 (i.e., 64) lens panes (or plurality of openings for 64 lens panes) and each triangular shaped two-dimensional convex lens array sub-assemblies 120, 122, 124, and 126 is shown to have 28 lens panes (or plurality of openings for 28 lens panes) and eight (8) half-sized lens panes (or plurality of openings for 8 half sized lens panes). This results in SRD 102 having, in this example, a total of 432 lens panes and 32 half sized lens panes. Each of the lens panes of the plurality of lens panes 104 can be flat lens panes approximating a parabolic shape in the corresponding lens array sub-assembly based on the size and number of the discrete flat lens panes in the lens array sub-assembly or actual convex shaped lens panes. Furthermore, each lens pane can be made from glass, acrylic, or other suitable material. Moreover, each lens pane can be a flat or sloped lens pane or a Fresnel lens such that SRD 102 can be assembled from a combination of flat lens panes, sloped panes, and Fresnel lenses. In general, the lens panes can be removable and interchangeable within the lens array assembly 100. Additionally, in order to make SRD 102 more dynamic, individual controls (not shown) can be installed in sections of the lens array assembly 100 or each opening that is configured to receive a lens pane in the lens array assembly 100 such that the controls are able to adjust the position of the individual panes to adjust the focus of SRD 102. Again, the octagon two-dimensional convex shape of the lens array assembly 100 is an example for illustration purposes and can be a different shape based on the design of the lens array assembly 100. FIGS. 13 and 14, for example, depict SRDs having different shapes from SRD 102.

Figure 2:
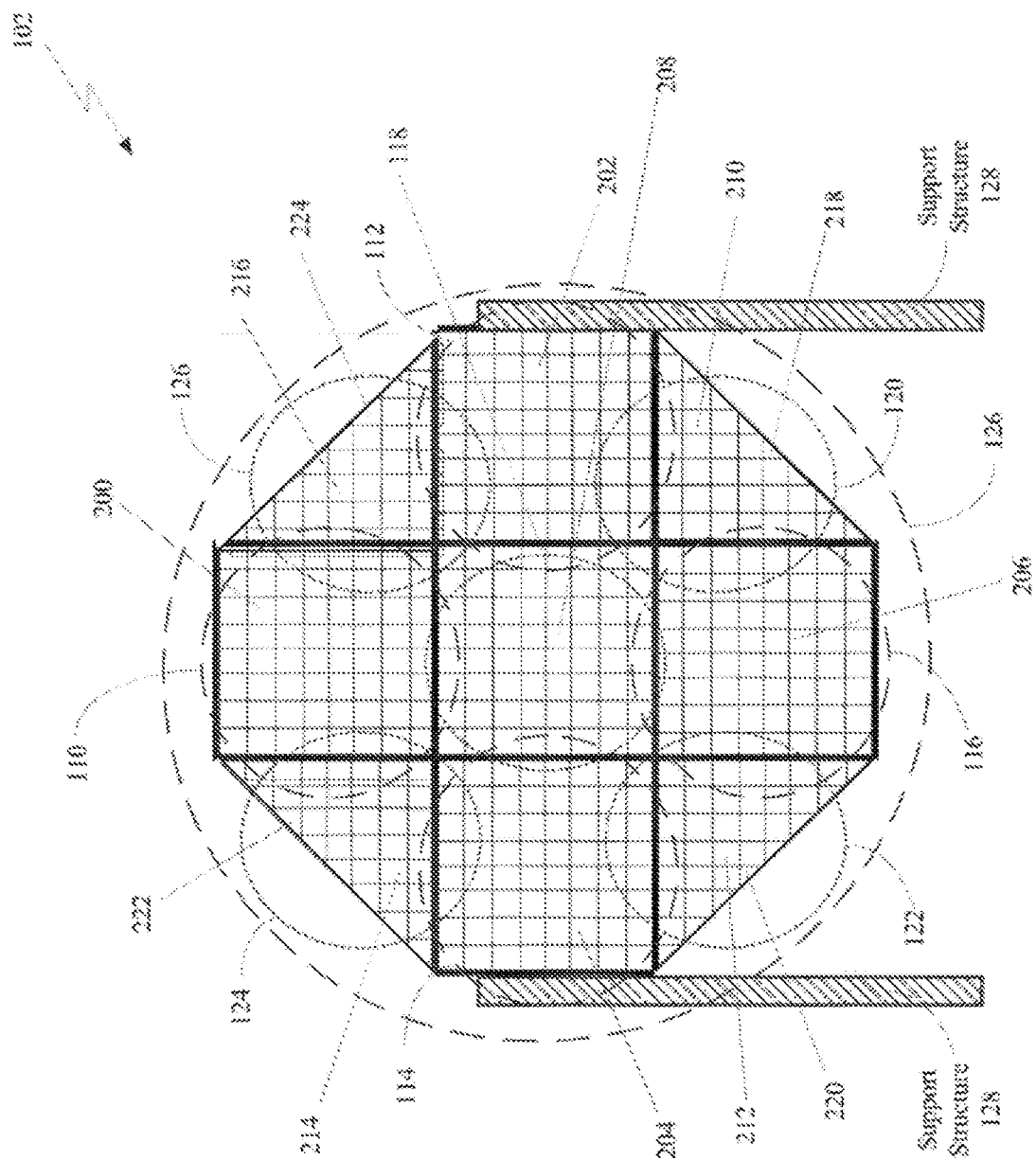
FIG. 2 is a back-view of the lens array assembly shown in FIG. 1 in accordance with the present disclosure.

Turning to FIG. 2, a back-view of the lens array assembly 100, shown in FIG. 1 along viewing plane A-A' 140, is shown in accordance with the present disclosure. FIG. 2 illustrates the relationship of the plurality of sub-assemblies 110, 112, 114, 116, 118, 120, 122, 124, and 126 and plurality of lens panes 104 in relationship with the lens array assembly 100. As described earlier, in this example, the lens array assembly 100 has an octagon shape and includes five rectangular shaped lens array sub-assemblies 110, 112, 114, 116, and 118, respectively, and four triangular shaped lens sub-assemblies 120, 122, 124, and 126, respectively. In this example, as described earlier, the five rectangular shaped lens array sub-assemblies 110, 112, 114, 116, and 118 include 64 lens panes designated by 200, 202, 204, 206, and 208, respectively. Similarly, the four triangular shaped lens array sub-assemblies 120, 122, 124, and 126 include 28 lens panes designated by 210, 212, 214, and 216, respectively, and 8 partial sized lens panes 218, 220, 222, and 224, respectively. If the four triangular shaped lens array sub-assemblies 120, 122, 124, and 126 are generally equivalent to half of a rectangular shaped lens array sub-assemblies, then the four triangular shaped lens array sub-assemblies 120, 122, 124, and 126 act as the equivalent of two rectangular shaped lens array sub-assemblies. In this case, the lens array assembly 100 can be described as having a total of seven (7) rectangular shaped lens array sub-assemblies instead of nine (9). As a result, the SRD 100 would have a total of 448 lens panes attached to the lens array assembly 100.

In general, the amount of energy produced by SRD 102 is directly related to the amount or intensity of solar energy incident upon the SRD, the location/positioning where the SRD will be utilized, and the array size of lens array assembly 100. For example, the higher the concentration of sunlight, the higher the amount of energy that is produced by SRD 102 for a given size of the lens array assembly 100. Specifically, according to the National Renewable Energy Laboratory ("NREL") average data from 1998 to 2009, areas within the United States such as Arizona and parts of California, Nevada, New Mexico, Colorado, and Hawaii receive as an annual average over 7.5 Kilowatt hours ("KWh") per square meter (m2) per day of concentrated solar power ("CSP") that is available for use by solar systems.

Generally, the amount of solar energy which falls on the Earth in any a calendar year dwarfs the total energy output of all the world's fossil fuels used in world's industries. For example, the State of Kentucky receives about 3.75 kW/m2 of solar energy per day from the Sun and higher energy areas, such as Hawaii, receive about 5.75 kW/m2 of solar energy per day. Only a fraction of these totals are used for creating useable energy with the current solar cells because, current commonly used solar cells generally only reach about 18% energy conversion due to losses of heat, reflection angle, and electricity transfer.

As such, utilizing Hawaii as an example for melting aluminum, a 6 foot by 6 foot (i.e., an area of about 4 m2) lens array sub-assembly 110, 112, 114, 116, and 118 would be able to focus about 4 KWh of solar energy such that lens array assembly 100 would be able to focus at least 28 KWh of solar energy taking into account the five (5) rectangular shaped lens array sub-assemblies 110, 112, 114, 116, and 118 and four (4) triangular shaped lens array sub-assemblies 120, 122, 124, and 126. Assuming, 85% efficiency in this example, SRD 102 would be capable of melting about 74 pounds of aluminum per hour.

Figure 3:
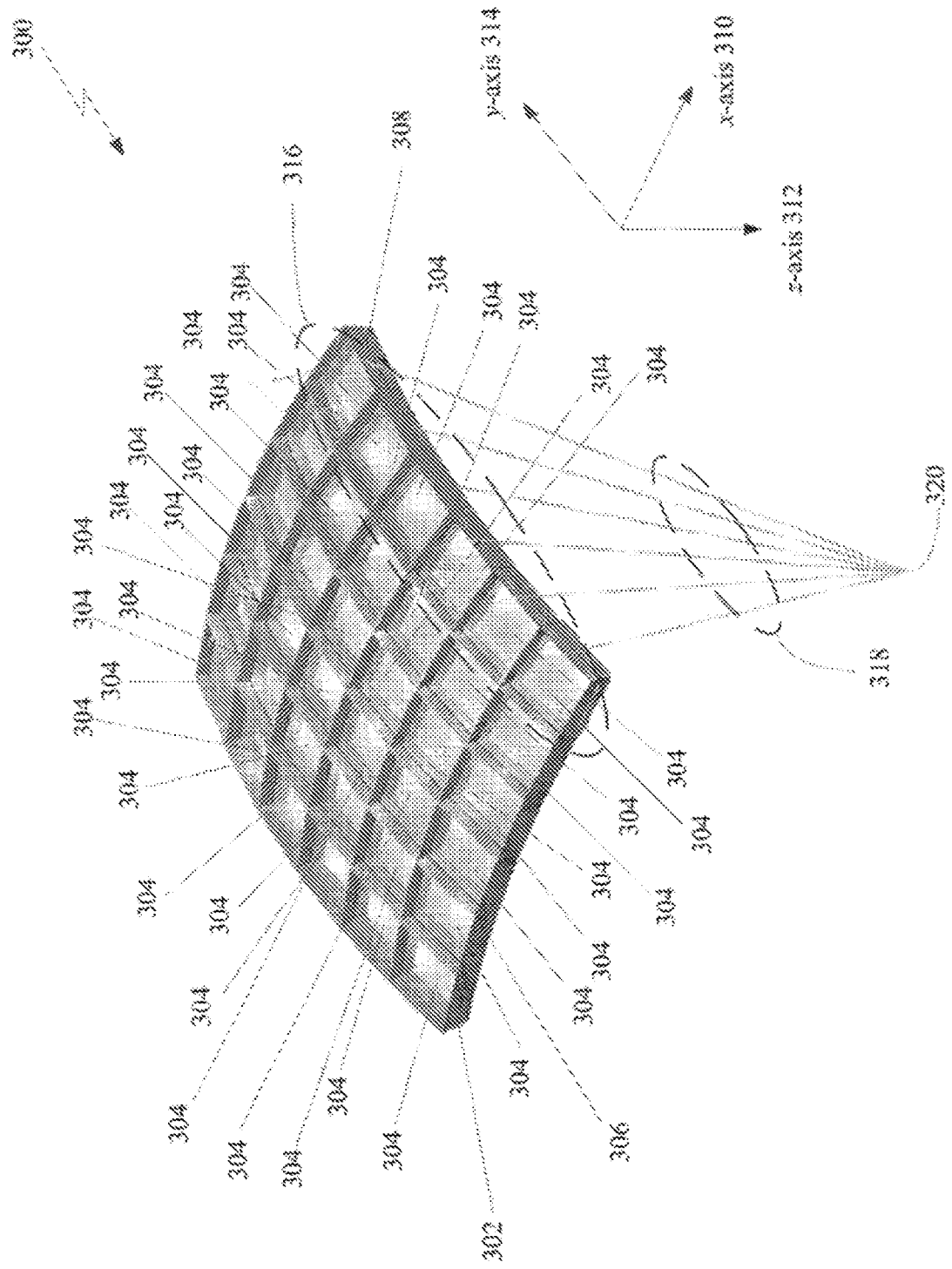
FIG. 3 is a perspective back-view of an example of an implementation of a lens array sub-assembly of the lens array assembly shown in FIGS. 1 and 2 in accordance with the present disclosure.

In FIG. 3, a perspective back-view of an example of an implementation of a lens array sub-assembly 300 of the lens array assembly 100 (shown in FIGS. 1 and 2) is shown in accordance with the present disclosure. The lens array sub-assembly 300 is show including a support frame 302 and approximately 36 lens panes 304 organized in six (6) rows and six (6) columns. The reason for only showing six (6) columns and rows in this example is for convenience of illustration since every lens pane 304 is being shown within a support frame of the lens array sub-assembly 300. The support frame is shown having a first side 306 and a second side 308. In this example, the convex curvature of the first side 306 of the support frame is shown along the x-axis 310 and z-axis 312. Similarly, the convex curvature of the second side 308 of the support frame is shown along the y-axis 314 and z-axis 312. As described earlier, the convex curvature can be approximately parabolic for both the first and second sides 306 and 308 of the support frame. If approximately parabolic, the lens array assembly 100 will produce a more focused beam of refracted solar energy 138 because in general a parabola is a special curve that has the mathematical relationship where all points of the parabola are an equal distance away from both a fixed line (mathematically referred to as the directrix) and a fixed point (mathematically referred to as the focus of the parabola, which is not to be confused with other instances of the term focus utilized in the present disclosure in connection with light or refracted solar energy).

Figure 4:
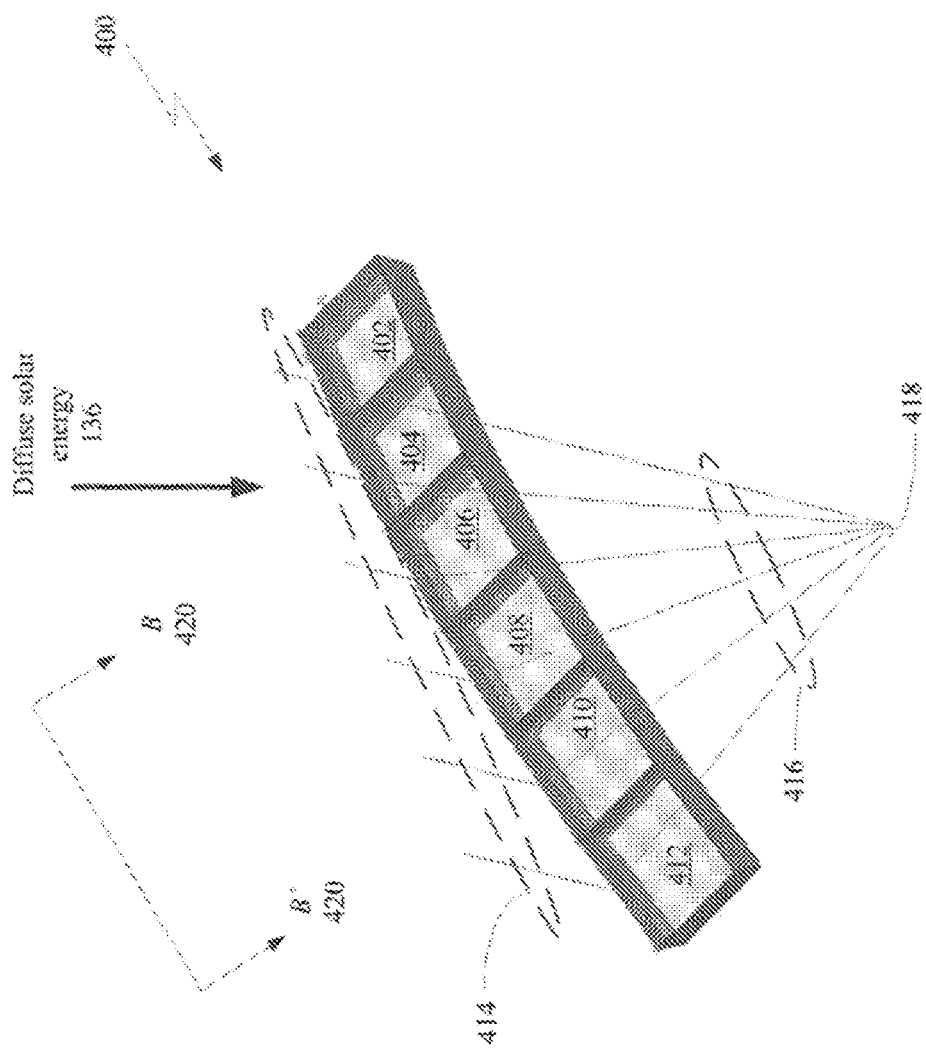
FIG. 4 is a perspective back-view of an example of an implementation of a single column array of lens panes of the lens array sub-assembly shown in FIGS. 1, 2, and 3 in accordance with the present disclosure.

Additionally, in FIG. 3, the panes 304 of a first column 316 of panes 304 is shown receiving diffuse solar energy and focusing 318 it to a focal point 320. More specifically, turning to FIG. 4, a perspective back-view of an example of an implementation of a single column array of lens panes 400 of the lens array sub-assembly shown 300 (shown in FIG. 3) is shown in accordance with the present disclosure. In this example, the single column array of lens panes 400 includes six (6) lens panes 402, 404, 406, 408, 410, and 412. As an example of operation, the single column array of lens panes 400 is configured to receive a portion 414 of the diffuse solar energy 136 that impinges on the outside surface of the SRD and refract that portion 414 through the lens panes 402, 404, 406, 408, 410, and 412 to produce a focused beam 416 of solar energy that is focused to focal point 418.

Figure 5B:
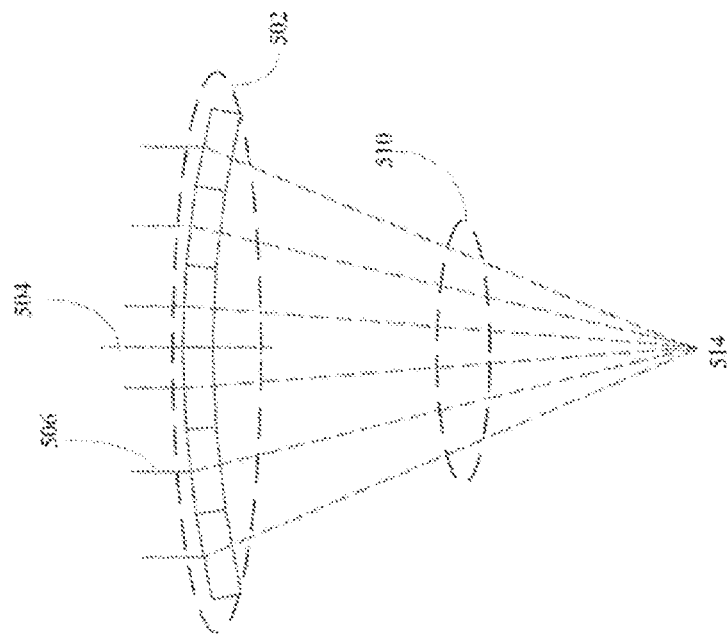
FIG. 5B is a system view of the single column array of lens panes shown in FIG. 4 in accordance with the present disclosure.
Figure 5A:
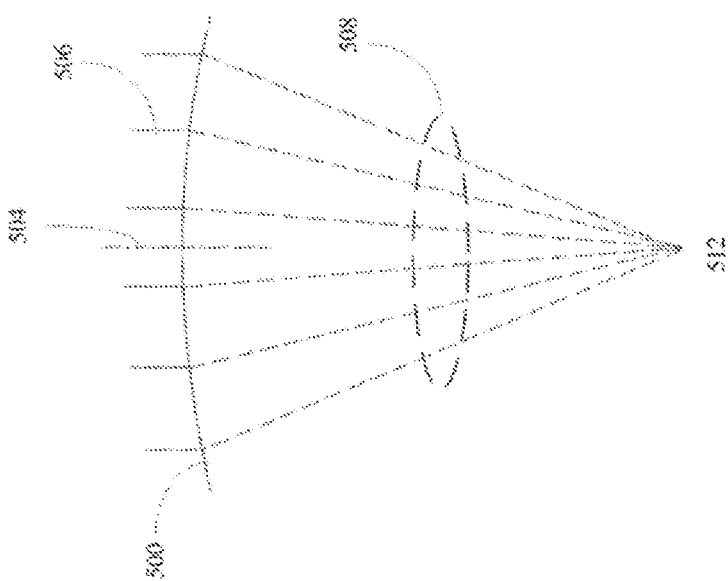
FIG. 5A is a system view of an example of implementation of a refracting convex lens.

To further explain this example, in FIGS. 5A and 5B, system views of a continuous refracting convex lens 500 and of the single column array of lens panes 502 (shown in FIG. 4 cut along plane B-B' 420) are shown along a center line 504. In both examples, impinging diffuse solar energy 506 is refracted and focused 508 and 510 to focal points 512 and 514, respectively. As a result, in operation, the discrete refracting convex lens created by the single column array of lens panes 502 focuses 510 the refracted solar energy to approximately the same focal point 514 as the focal point 512 of the continuous refracting convex lens 500.

Figure 6:
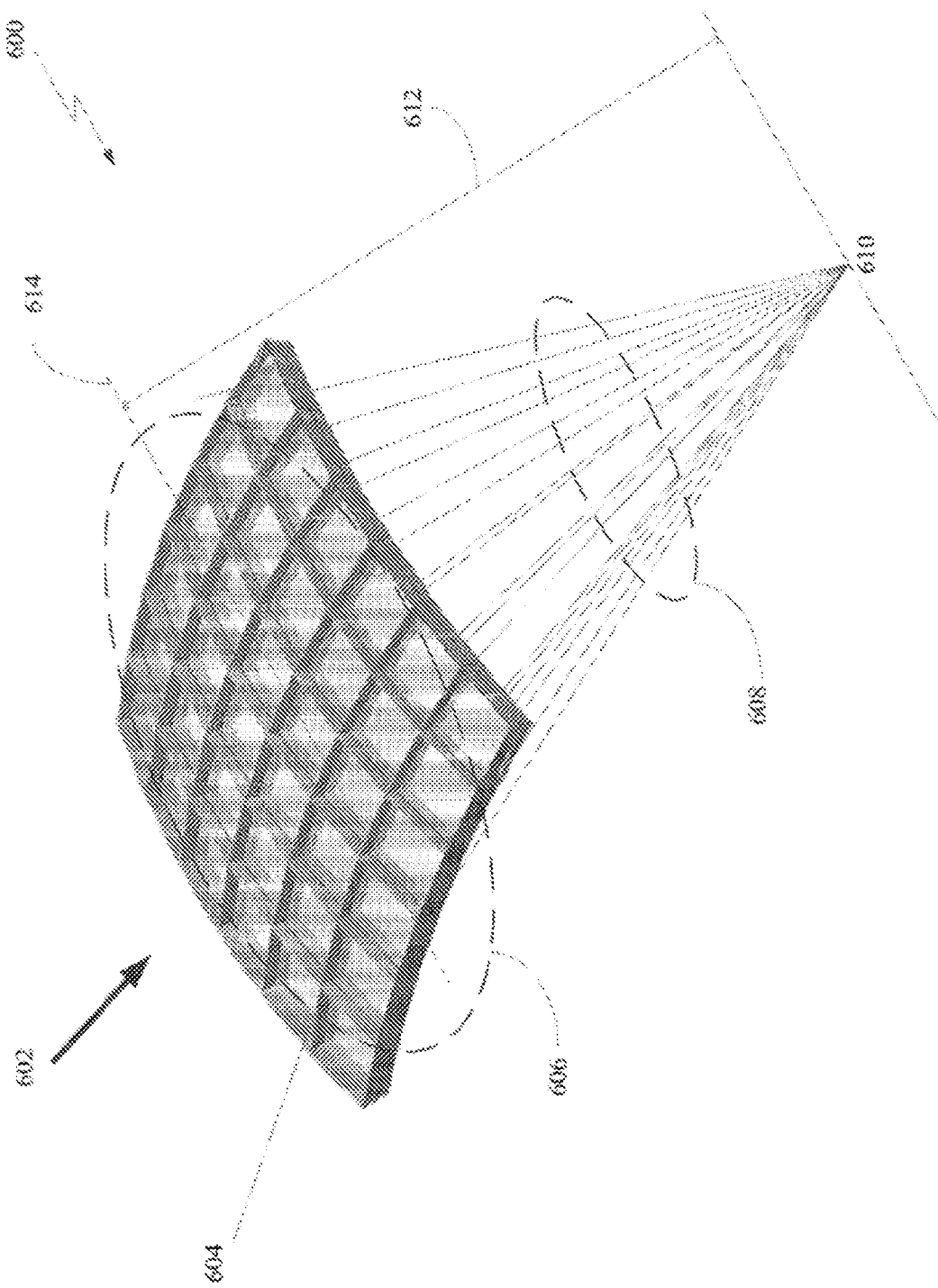
FIG. 6 is a perspective side-view of the lens array sub-assembly shown in FIG. 3 in accordance with the present disclosure.

In FIG. 6, a perspective side-view of a lens array sub-assembly 600 (shown in FIG. 3 as lens array sub-assembly 300) is shown in accordance with the present disclosure. In contrast to FIG. 3, in FIG. 6, an example of operation is shown where diffuse solar energy 602 impinges on an outside surface 604 of lens array sub-assembly 600 that includes a plurality of lens panes 606. Each lens pane of the plurality of lens panes 606 then refracts a portion of the diffuse solar energy 602. In this example, all of the refracted beams from the plurality of lens panes 606 are focused 608 into a focal point 610 that is utilized to heat an object (not shown). Within FIG. 6, the focal length 612 of the lens array sub-assembly 600 is shown as the distance between the focal point 610 and a centerline 614 of the lens array sub-assembly 600. This focal length 612 is based on the design of the lens array sub-assembly 600. Turning back to FIGS. 1 and 2, it is noted that there are multiple lens array sub-assemblies 110, 112, 114, 116, 118, 120, 122, 124, and 126 that each have their own corresponding focal length. Additionally, these multiple focal lengths can be equal or not equal to each other based on the design of the SRD for heating an object. By having different focal lengths or different focal points for each lens array sub-assembly 110, 112, 114, 116, 118, 120, 122, 124, and 126, the lens array assembly 100 focus the diffused solar energy over a region rather than an individual point. This allows SRD 102 to heat an object at a heating plane by distributing the heat of the focused solar energy over a region of the heating plane. If solar energy refracted by the SRD is overly focused rather than being distributed over a region, the refracted solar energy can damage or burn the object being heated, which can include the container or materials contained therein.

Figure 7:
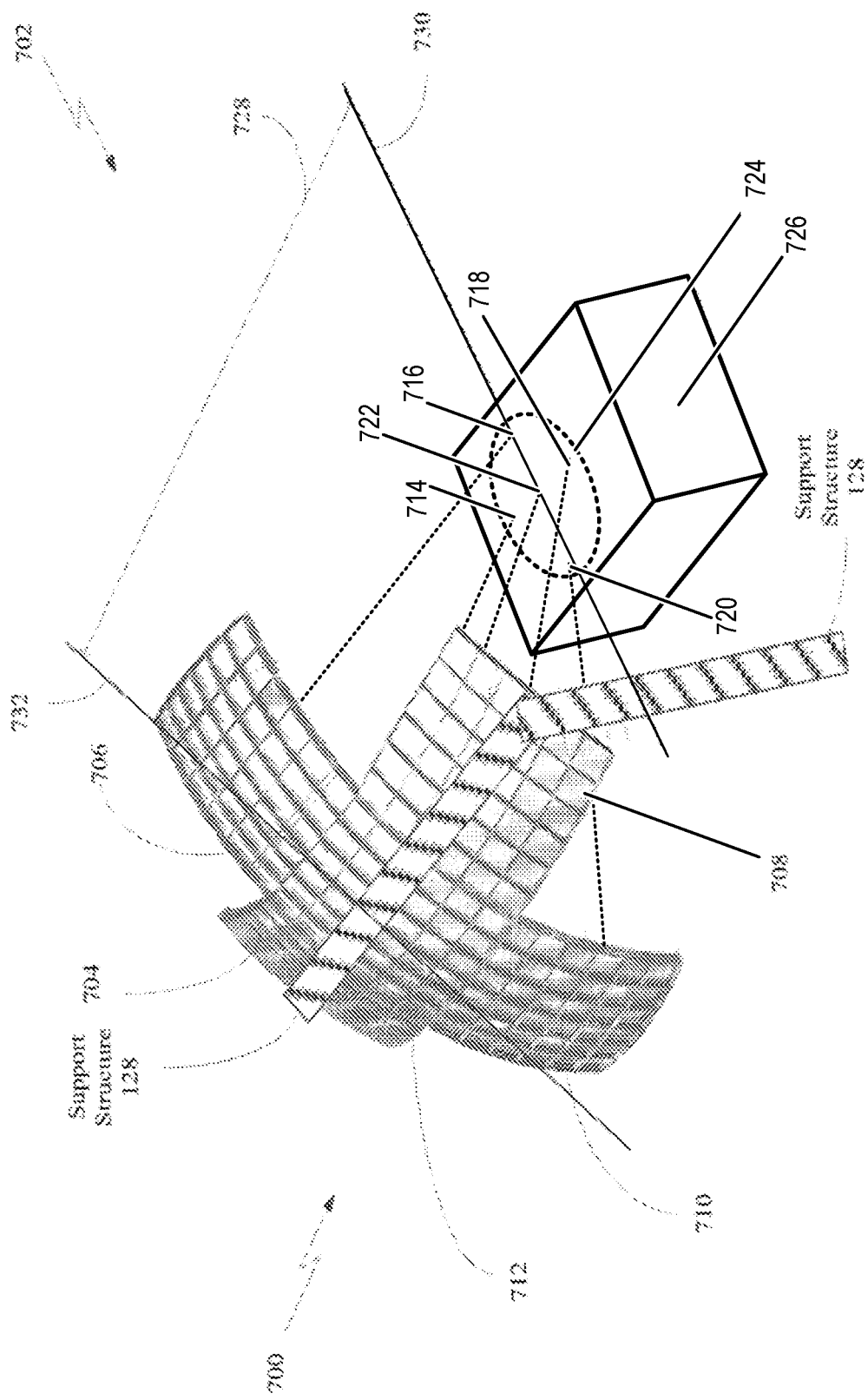
FIG. 7 is a perspective back-view of another example of an implementation of a lens array assembly of the solar refraction device and a heating container in accordance with the present disclosure.

Expanding on this in FIG. 7, a perspective back-view of another example of an implementation of a lens array assembly 700 of the SRD 702 is shown in accordance with the present disclosure. In this example, the lens array assembly 700 is shown having five (5) rectangular shaped lens array sub-assemblies 704, 706, 708, 710, and 712, respectively. Additional triangular shaped lens array sub-assemblies can be added as described earlier, however, in this example only five (5) rectangular shaped lens array sub-assemblies 704, 706, 708, 710, and 712 are shown for the purpose of illustration. In this example, the lens array assembly 700 is shown having five different focal lengths or focal points 714, 716, 718, 720, and 722 for the individual lens array sub-assemblies 704, 706, 708, 710, and 712. The resulting focal points define a heating area 724 upon a closed heating container 726. It will be understood that heating container 726 is merely one example of a closed container that can be used to heat materials. In the example of FIG. 7, heating area 724 is defined in size and shape by the plurality of focal points 714, 716, 718, 720, and 722 so that the heating area is located upon an exterior surface of the container within a region bounded by the container, but is also sufficiently distributed to avoid excessive heating that can damage the container or its contents.

Additionally, shown in this example is a schematic representation of support structure 128 that can be used to support lens array assembly 700. In this example, the heating area 724 is shown to be a predetermined distance 728 from the lens array assembly 700. Specifically, the predetermined distance 728 is defined as the distance 728 between a centerline 730 of the plane of the heating area 724 and another centerline 732 of lens array assembly 700. The predetermined distance 728 is generally related to the focal lengths of the individual lens array sub-assemblies 704, 706, 708, 710, and 712 that produce respective focal points 714, 716, 718, 720, and 722 that define heating area 724. As a result, the predetermined distance 728 is based on the design of the lens array assembly 700, because the focal lengths are based on the design of the lens array sub-assembly 700. In an example, support structure 128 is configured to maintain this predetermined distance 728 between the lens array assembly 700 and heating area 724 located upon an exterior of heating container 726. As such, since the type of material, thickness, position, and angle of the lens panes within each lens array sub-assemblies 704, 706, 708, 710, and 712 determines the corresponding focal points 714, 716, 718, 720, and 722, it is appreciated that the type of material, thickness, position, and angle of the lens panes within each lens array sub-assemblies 704, 706, 708, 710, and 712 can be designed or otherwise selected such that they produce the corresponding focal points 714, 716, 718, 720, and 722 at the predetermined distance 728 and desired arrangement.

Figure 8:
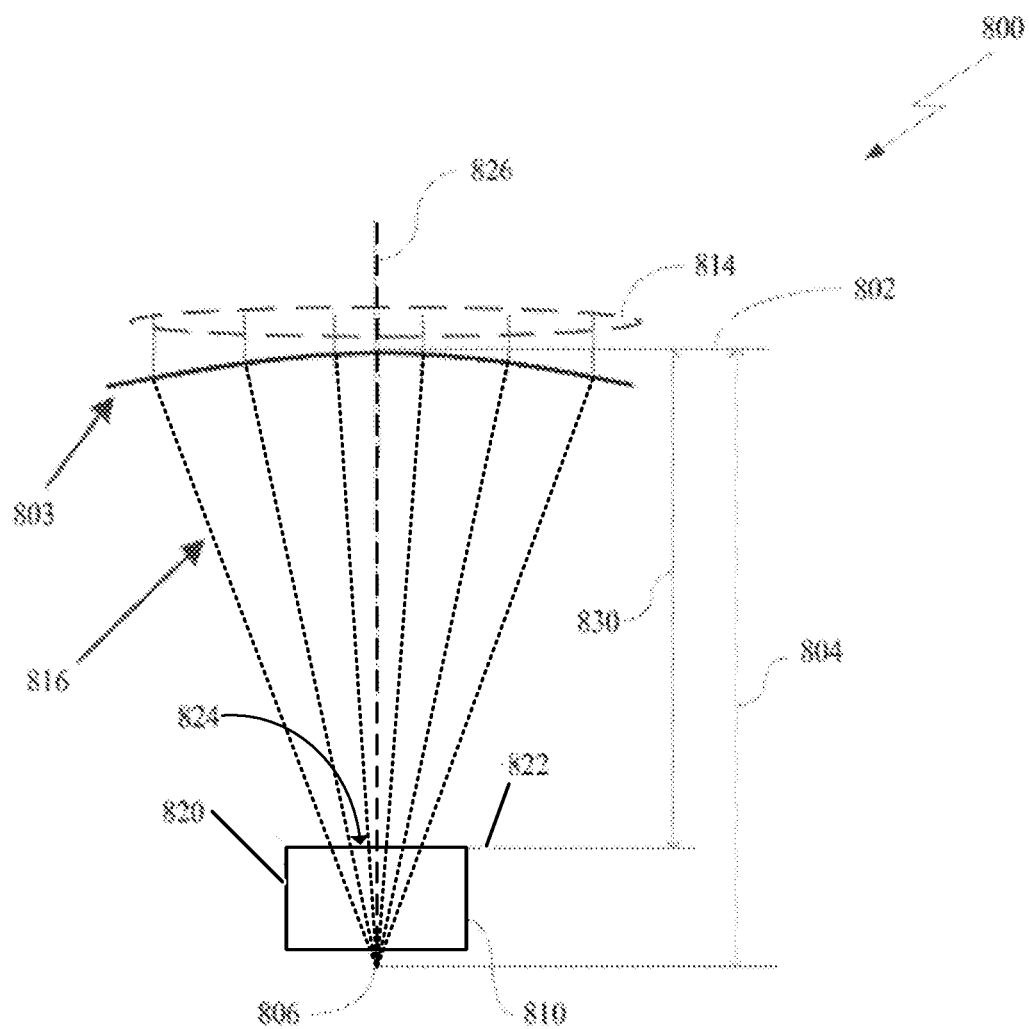
FIG. 8 is a system view of the solar refraction device shown in FIG. 7 in accordance with the present invention.

In FIG. 8, a system view of an SRD 800 is shown in accordance with the present disclosure. In this example, a centerline 802 is shown for equivalent lens 803 of plurality of lens panes of SRD 800. SRD 800 is shown to have a focal length 804 that extends to a focal point 806 beyond an exterior surface of heating container 810 that faces SRD 800. As an example of operation, the heating container 810 contains a material to be heated such as, for example, aluminum. The impinging diffuse solar energy 814 is refracted by the plurality of lens panes of the SRD 800 to form a plurality of refracted solar beams 816 (also known as rays). Since, an exterior surface of heating container 810 encloses the material contained therein, the focused refracted solar beams 816 cannot concentrate their combined energy at focal point 806 and instead impinge on the exterior surface of container 810 at a heating plane 820. Since heating plane 820 is located between the SRD 800 and focal point 806, the resulting heat generated by the focused refracted solar beams 816 is distributed over a heating area 822 that resides within heating plane 820. In an example, heating area 822 is defined as a relatively small area compared to the size of SRD 800. By properly designing or otherwise positioning SRD 800 relative to an object to be heated, heating area 822 receives the proper amount of energy from SRD 800 to heat the object (e.g., material 812 in this example) within suitable parameters. In this example, SRD 800 provides the greatest intensity of refracted solar energy along centerline 826, with the refracted solar energy being more diffuse moving outwards from the centerline 826. As such, the greatest intensity of heat energy provided by refracted solar energy within heating plane 820, within this example, is at the intersection of heating plane 820 with centerline 826. Intensity of the heat provided by the refracted solar radiation diminishes, in this example, as distance increases from centerline 826 within heating area 822. As described earlier, the focal length 804 is related to the predetermined length 830 between centerline 802 of equivalent lens 803 to the heating container 810, where the predetermined length 830 is the length from the centerline 802 to the heating plane 820.

Figure 9:
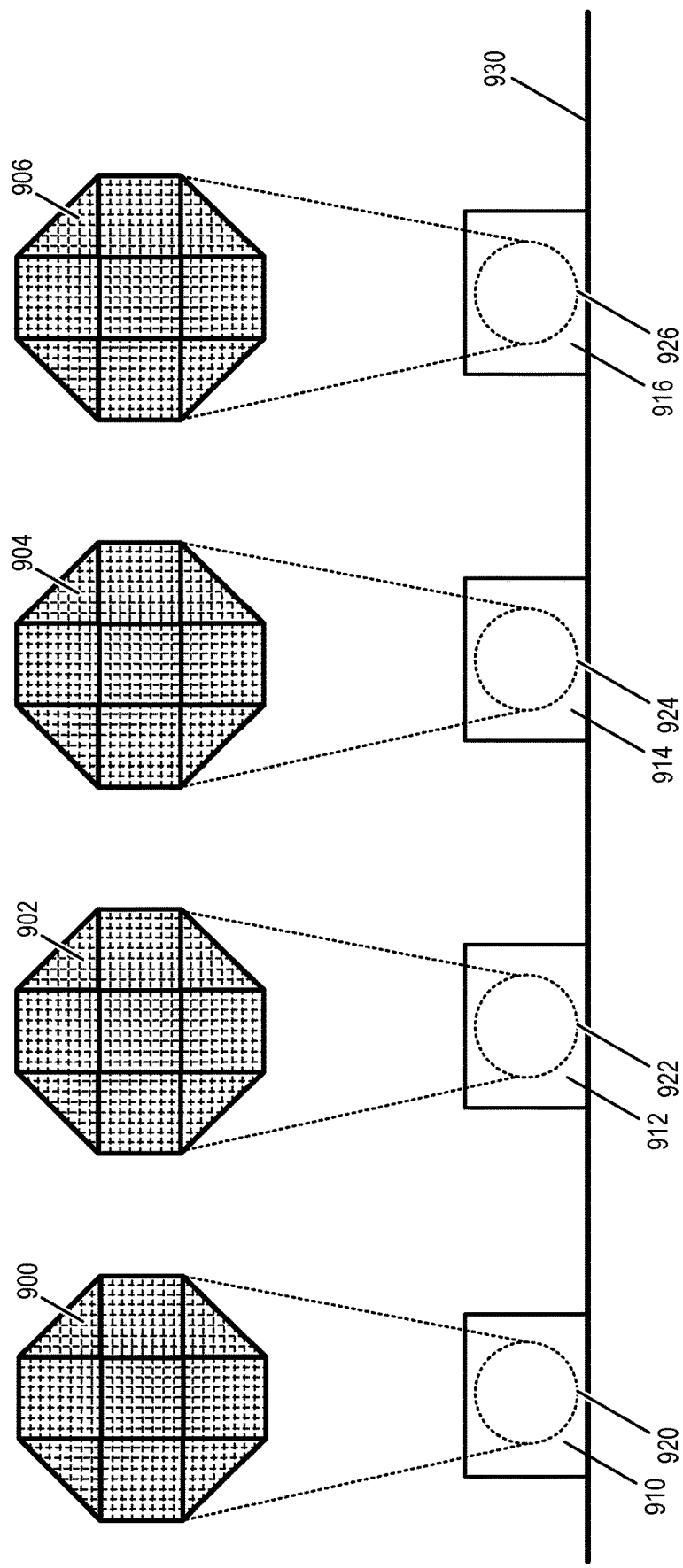
FIG. 9 is a perspective back-view of a plurality of solar refraction devices, as shown in FIGS. 7 and 8, utilized to heat or melt a material in accordance with the present disclosure.

In some cases, an individual instance of SRD 800 is not sufficient to generate enough energy to heat an object to a desired state or to process a series of objects within a given time period. In these cases, multiple SRDs can be utilized together (e.g., in a chain) to increase the available heat energy or to increase a quantity of objects that can be heated within a given time period. FIG. 9 shows an example in which a plurality of SRDs 900, 902, 904, and 906 are utilized to heat material enclosed in a plurality of heating containers 910, 912, 914, and 916, respectively. In this example, SRDs 900, 902, 904, and 906 direct refracted solar energy onto exterior surfaces of the heating containers to form respective heating areas 920, 922, 924, and 926. The multiple SRDs 900, 902, 904, and 906 can be positioned by any known solar tracking system to collect the optimal quantity of solar light during the day. To maintain the optimal energy focusing of the SRDs 900, 902, 904, and 906, the heating containers 910, 912, 914, and 916 can be moved from one SRD to the next via a track system 930. In this example, the track system 902 is configured to input or extract a given heating container 910, 912, 914, and 916 at any point during the heating process to remove melted or heated material and input unheated materials that are enclosed within unheated containers.

Figure 10:
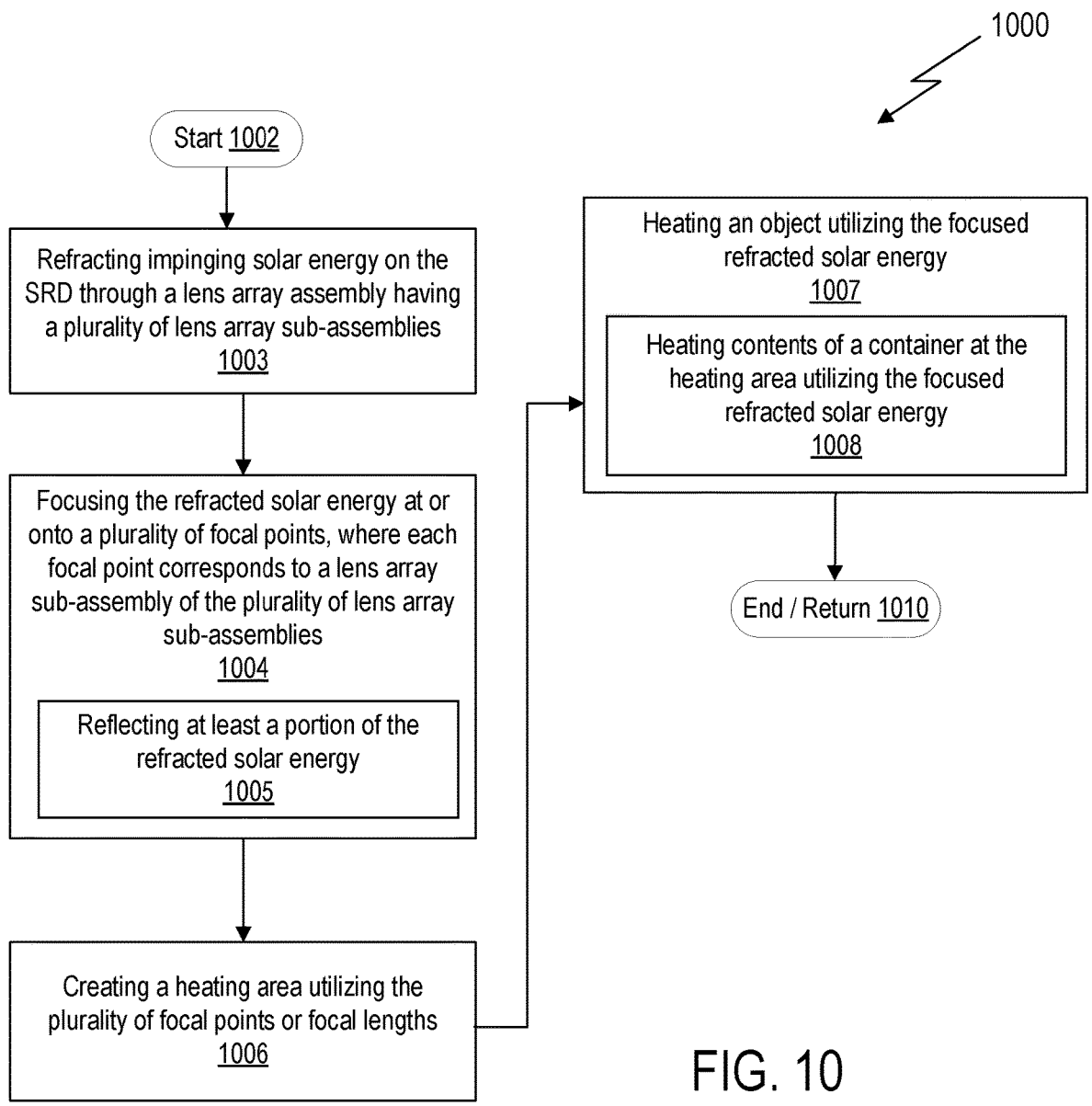
FIG. 10 is a flowchart of an example of an implementation of a method performed by the solar refraction device shown in FIGS. 1-9 in accordance with the present disclosure.

Turning to FIG. 10, a flowchart 1000 of an example method performed by or with respect to an SRD is shown in accordance with the present disclosure. The SRD of flowchart 1000 can refer to any of the example SRDs disclosed herein. In general, the method includes heating an object, such as a container that contains one or more materials, with solar energy refracted by the SRD. The container can be closed container that includes materials contained within the container, such as previously described with reference to FIGS. 7 and 8.

The method starts at 1002 by, in step 1003, refracting solar energy impinging on the SRD through a lens array assembly having a plurality of lens array sub-assemblies and, in step 1004, focusing the refracted solar energy onto a plurality of focal points. Each focal point of the plurality of focal points corresponds to a corresponding lens array sub-assembly of the plurality of lens array sub-assemblies. In at least some examples, at least a portion of the refracted solar energy can be reflected at 1005. FIG. 14 depicts an example in which reflector are used to reflect some of the refracted solar energy provided by an SRD.

In at least some examples, each focal point can be spaced apart from each other focal point of the plurality of focal points to define a heating area. In these examples, the method at 1006 includes creating a heating area with respect to an object to be heated (e.g., upon an exterior surface of the heating container) utilizing the plurality of focal points as defined, at least in part, by their respective focal lengths. In step 1007, the object is heated utilizing the focused refracted solar energy. For example, in step 1008, contents of a container (e.g., containing one or more materials) are heated at the heating area utilizing the focused refracted solar energy. At 1010, the method ends or returns to the start at 1002.

Figure 11:
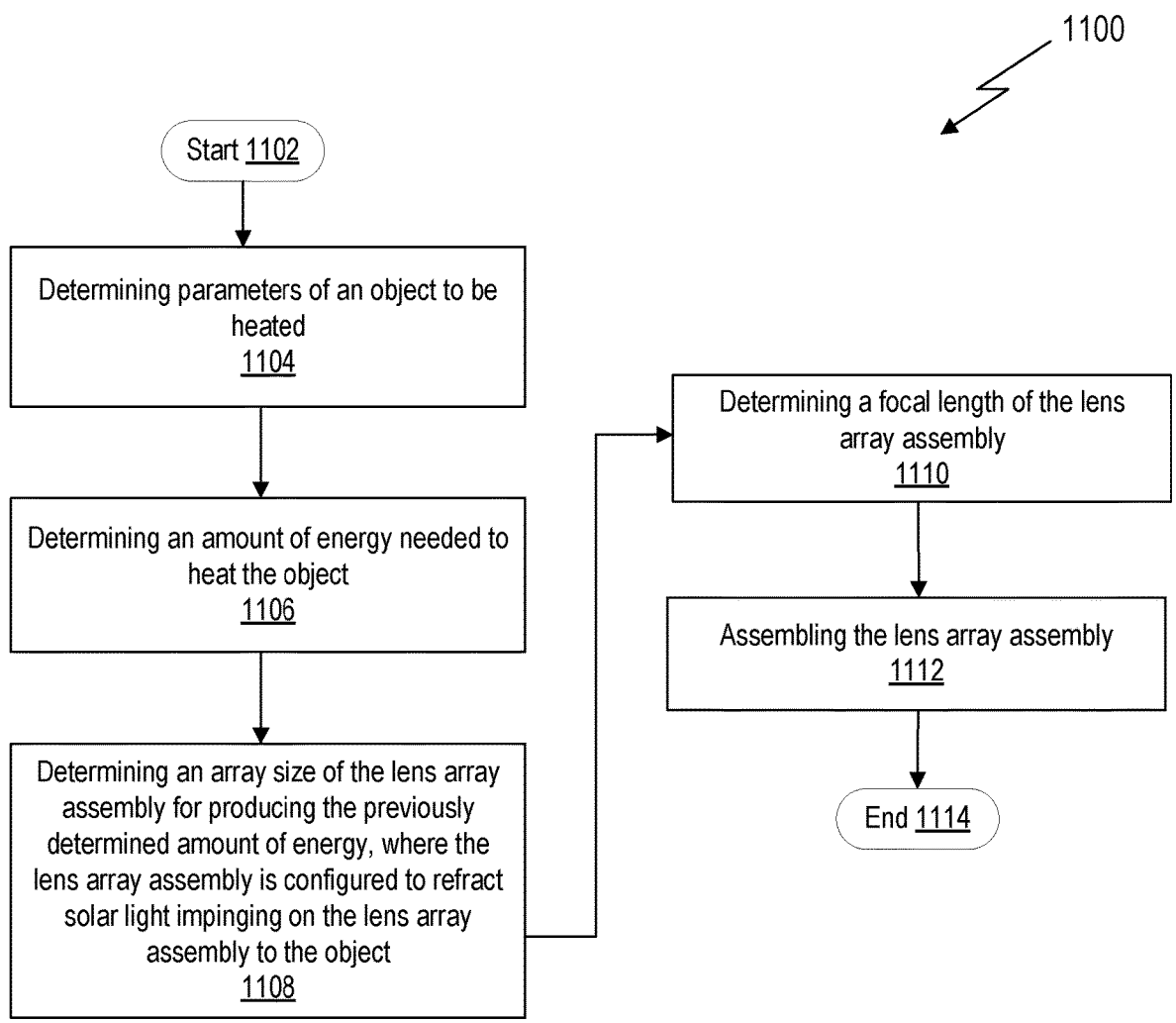
FIG. 11 is a flowchart of an example of an implementation of a method performed in fabricating the solar refraction device in accordance with the present disclosure.

In FIG. 11, a flowchart 1100 of an example method performed in fabricating an SRD is shown in accordance with the present disclosure. The method starting at 1102 includes determining, at 1104, parameters of an object to be heated. For example, the method at 1104 can include determining a size, shape, mass, composition, reflectivity, specific heat, flow rate (e.g., in material flow applications) and initial conditions (e.g., temperature, pressure, phase, etc.) for materials to be heated. Where the object further includes a container that encloses materials are to be heated, the method at 1104 can include determining a size, shape, mass, composition, reflectivity, specific heat, and initial conditions for the container.

The method at 1106 includes determining an amount of energy needed to heat the object to a desired temperature and/or phase within a defined time period based on the parameters determined at 1104. As an example, to melt aluminum, an SRD might need to provide approximately 30,000 watts of refracted solar energy to melt about 100 pounds of aluminum per hour.

The method at 1108 includes determining an array size for the lens array assembly for producing the previously determined amount of energy for a given density of solar energy impinging on the lens array assembly. As previously discussed, the lens array assembly is configured to refract solar light impinging on the lens array assembly to the object being heated. As an example, in Hawaii the Sun produces about 1,000 watts per square meter so the lens array assembly needs to be approximately 30 m2 (i.e., about 6 meters by 6 meters).

The method at 1110 determines a focal length of the lens array assembly based on the geometry of the lens array assembly. The method at 1112 includes assembling the lens array assembly. The method then ends at 1114. In this example, assembling the lens array assembly can include assembling a plurality of lens array sub-assemblies and attaching the plurality of lens array sub-assemblies to form the lens array assembly, where each lens array sub-assembly has a corresponding focal length. As previously discussed, each lens array sub-assembly has a convex shape in at least some examples. Assembling the lens array assembly includes attaching a plurality of lens panes to each plurality of lens array sub-assemblies. In one example, the lens panes include Fresnel lenses. Moreover, assembling the lens array assembly also includes a first lens array sub-assembly with a different corresponding focal length than a second focal length corresponding to a second lens array sub-assembly of the lens array assembly. However, some or all of the lens array sub-assemblies of an SRD can have the same focal length in another example.

It will be appreciated by those of ordinary skill in the art that the examples of an SRD disclosed herein can be used to heat materials contained within an enclosure to increase the temperature of the materials or to change the phase of the materials (e.g., from solid to liquid or from liquid to vapor). For example, an SRD can be used to heat a fluid contained within a container such as an enclosed pipe, pressure vessel or other enclosed vessel, furnace, reactor, etc. The container can form part of a chemical processing system, electrochemical processing system, oil refinery, food processing system, power plant, industrial boiler, physical plant (e.g., radiative heating), heating system (e.g., HVAC), sanitation system, etc. In at least some examples, the fluid can include an intermediate working fluid (e.g., water) that is used to transfer heat to a heat sink. In examples where an intermediate working fluid is used, this intermediate working fluid can provide power to machinery (e.g., turbines) or heat to another system or material (e.g., chemicals, foods, fossil fuels, etc.).

Figure 12:
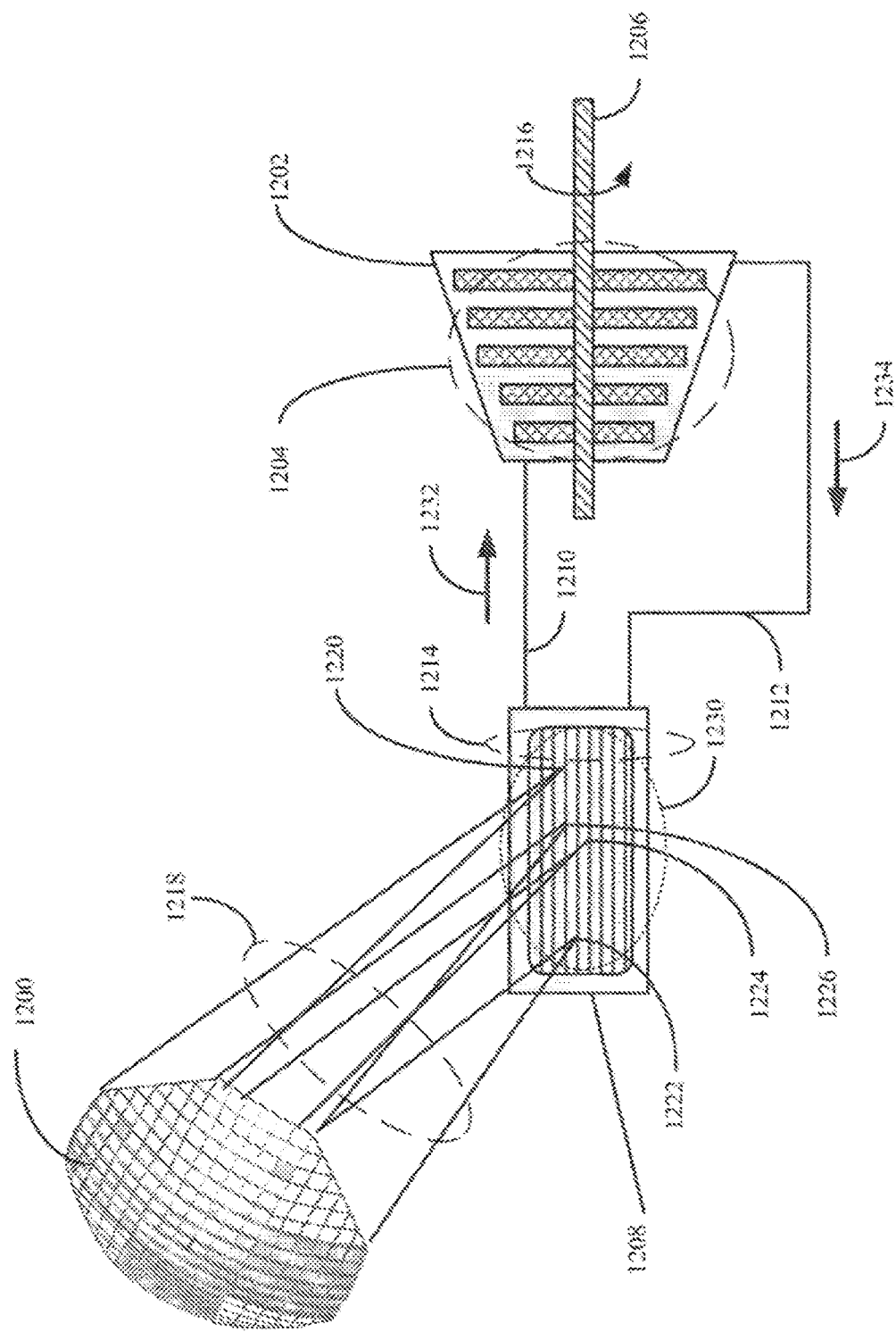
FIG. 12 is a system diagram of an example of an implementation of the solar refraction device utilized for powering a turbine in accordance with the present disclosure.

Turning to FIG. 12, a system diagram of an example of an implementation of the SRD 1200 utilized for powering a turbine 1202 is shown in accordance with the present disclosure. The turbine 1202 can include a plurality of turbine blades (also known as vanes) 1204 and a shaft 1206. In this example, the turbine 1202 is connected to a heating container 1208 via at least an inflow tubular pipe 1210 and outflow tubular pipe 1212. The heating container 1208 includes a plurality of heating pipes 1214 within the heating container 1208 that are configured to be heated by the SRD 1200. The heating pipes 1214 can be filled with a fluid such as, for example, a gas (such as, for example, air), steam, water, or other heatable fluid that is capable of being heated in the heating container 1208 and passed to the turbine 1202. Turbine 1202 is a rotary machine that extracts energy from the resulting fluid flow and converts it into useful work energy that rotates 1216 shaft 1206. In an example of operation, the SRD 1200 receives solar energy and focuses at 1218 refracted solar energy towards heating pipes 1214 of heating container 1208. As previously discussed, multiple focal points 1220, 1222, 1224, and 1226 can be focused at 1218 towards the heating container 1208 to define a heating area 1230 with respect to heating container 1208. The fluid in the heating pipes 1214 is then heated up and the heated fluid is passed to the turbine 1202 via inflow tubular pipe 1210 in the direction of 1232. The heated fluid turns the turbine blades 1204 resulting in the shaft 1206 rotating 1216 along its axis. The exhausted fluid is returned to the heating container 1208 via the outflow tubular pipe 1212 in the direction 1234. It is appreciated by those of ordinary skill in the art that other industrial heating examples can be implemented by utilizing the SRD 1200 as a heating device for other materials.

FIG. 13 shows an example solar heating system 1300 including an SRD 1310 and a pipe segment 1320 that can be heated by solar energy refracted by SRD 1310. SRD 1310 can incorporate any of the SRD configurations disclosed herein, including a lens assembly having a plurality of lens array sub-assemblies in which each lens array sub-assembly provides a corresponding focal point of refracted solar energy that is positioned to heat the contents enclosed within pipe segment 1320. Pipe segment 1320 is one example of a container for contents to be heated by an SRD. Within the context of a container that encloses contents, the focal points of refracted solar energy provided by SRD 1310 can be positioned at a surface of the container (e.g., an exterior of pipe segments 1320).

In this example, pipe segment 1320 forms part of a pipe system 1322 represented schematically in FIG. 13 that contains a flow of contents. For example, pipe system 1322 can form a closed loop containing a material (e.g., a fluid such as a liquid or gas, or granulated solids). Accordingly, pipe system 1322 is one example of an enclosed container that can be heated by an SRD. Pipe system 1322 can be connected to one or more system components 1330 represented schematically in FIG. 13 such that pipe segment 1320 is in fluid communication with the system components. In an example, pipe system 1322 in combination with system components 1330 forms a closed loop containing a material (e.g., a fluid or granulated solids). Accordingly, pipe system 1322 in combination with system components 1330 is another example of an enclosed container that can be heated by an SRD.

System components 1330 can include one or more mechanical conveyance machines (e.g., a pump or auger conveyor) to convey or circulate a material within the pipe system 1322 in a particular flow direction. System components 1330 can include one or more heat sinks that extract heat from a material contained within pipe system 1322. Examples of heat sinks include mechanical machines (e.g., turbines) that extract heat energy from a material and convert that heat energy into work, heat exchangers, or other materials to be heated.

In the example depicted in FIG. 13, SRD 1310 has a curved shape within a plane that is orthogonal to a longitudinal axis 1324 of pipe segment 1320. Surface 1312 of SRD 1310 that faces pipe segment 1320 forms an interior of the curved shape. Thus, in this example, the shape of SRD 1310 is generally contoured to the shape of the object to be heated by the SRD, which in this case takes the form of segment 1320 having a round cross-section. System 1300 further includes a support structure 1340 in this example. For example, support structure 1340 supports SRD 1310 relative to pipe segment 1320. However, pipe segment 1320 and SRD 1310 can be separately supported in other examples. It will be understood that SRD 1310 can have other suitable shapes and configurations from the example depicted in FIG. 13 to heat enclosed containers, including pipe systems that convey materials along a flow direction.

FIG. 14 shows an example solar heating system 1400 including an SRD 1410 and one or more reflectors 1420 (e.g., mirrors) positioned to reflect at least a portion of refracted solar energy 1412 received from the SRD toward an object 1430. SRD 1410 can incorporate any of the SRD configurations disclosed herein, including a lens assembly having a plurality of lens array sub-assemblies in which each lens array sub-assembly provides a corresponding focal point of refracted solar energy that is positioned to heat object 1430. In the example depicted in FIG. 14, SRD 1410 forms a canopy and has a curved shape. Thus, SRD 1410 can shield object 1430 from precipitation or other contaminants in addition to providing refracted solar energy for heating. Object 1430 can refer to any of the containers or materials disclosed herein that is heated by an SRD.

One example of reflectors 1420 is depicted at 1422 reflecting a first portion 1440 of refracted solar energy 1412 received from SRD 1410 toward object 1430. For example, this first portion 1440 of refracted solar energy 1412 can be focused at a first focal point that is positioned to heat object 1430 at a first location 1450. FIG. 14 further depicts a second portion 1442 of refracted solar energy 1412 received from SRD 1410 being focused at a second focal point that is positioned to heat object 1430 at a second location 1452. In this example, the second portion 1442 of the refracted solar energy is not reflected by a reflector. Reflectors 1420 can be used to reflect different portions of the refracted solar energy received from SRD 1410 to the same focal point or to different focal points that are spaced apart from each other. A second example of reflectors 1420 is depicted at 1424 reflecting a third portion 1444 of refracted solar energy 1412 received from SRD 1410 toward object 1430. In this example, the third portion 1444 of the refracted solar energy is focused at a third focal point that is positioned to heat object 1403 at a third location 1454 that is spaced apart from locations 1450 and 1452.

Reflectors, such as example reflectors 1420, can be used to direct refracted solar energy to different regions of an object, including regions that reside outside of the optical path of the refracted solar energy emitted from surfaces of the SRD. For example, as depicted in FIG. 14, reflectors can be used to direct refracted solar energy to an underside or side regions of object 1430. In these examples, reflectors can be arranged around or partially beneath the object being heated. Reflectors 1420 can be flat or curved, including reflectors that have a planar reflective surface, a convex reflective surface (e.g., semi-circular or parabolic as viewed in cross-section), or a concave reflective surface (e.g., semi-circular or parabolic as viewed in cross-section).

The use of reflectors with an SRD has the potential to increase heating efficiency of the solar heating system by using refracted solar energy that would otherwise not come into contact with the object. For example, reflectors can be configured to accommodate variations in an angle of the refracted solar energy as the sun transits the sky. Additionally or alternatively, the use of reflectors with an SRD has the potential to more evenly heat an object over its various surfaces. Reflectors can be positioned at fixed positions and orientations relative to an SRD or to an object to be heated by the SRD. However, in at least some examples, reflectors are moveable (e.g., by electromechanical actuators) in one or more degrees of freedom (e.g., translation and/or rotation relative to one, two, or three axes) to enable the reflectors to accommodate a variety of lighting conditions, heating scenarios, and object configurations.

Figure 15:
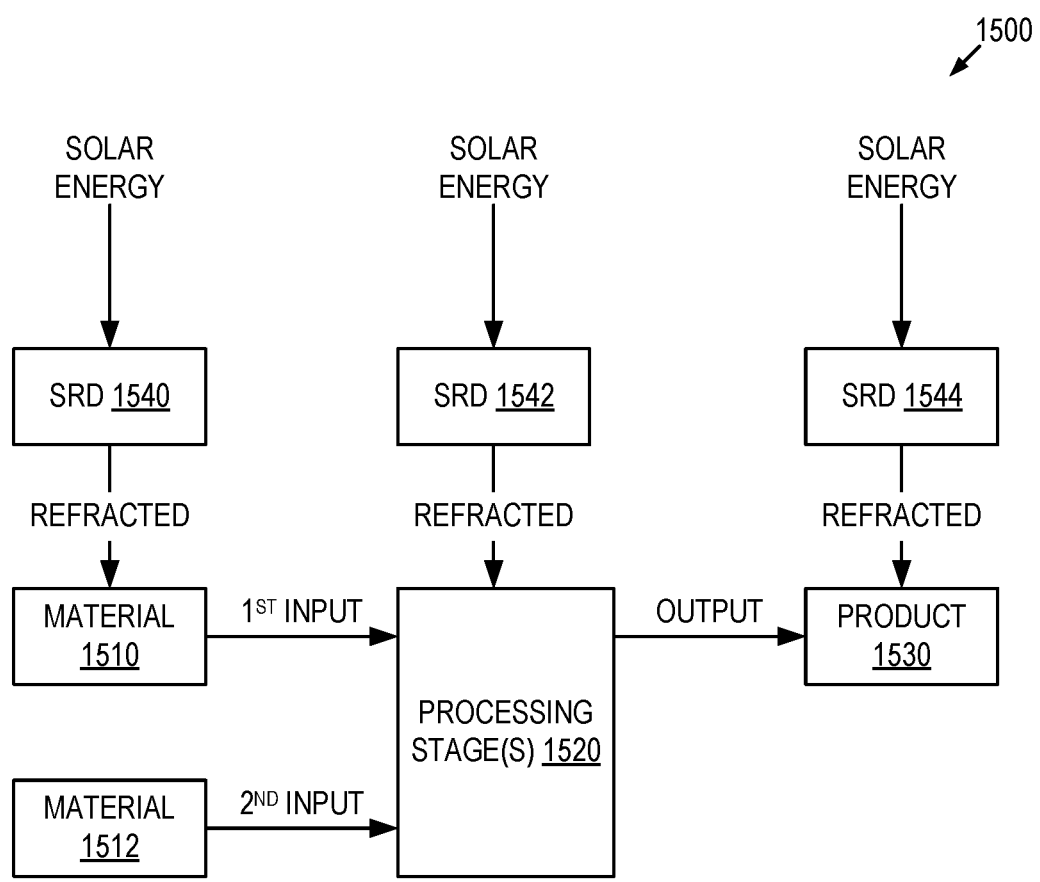
FIG. 15 shows a schematic depiction of an example processing system that incorporates one or more solar refraction devices.

FIG. 15 shows a processing system 1500 that incorporates one or more SRDs 1540, 1542, 1544, etc. at various stages of a manufacturing process. The SRDs in this example include any of the example SRDs disclosed herein. As one example, solar energy refracted by SRD 1540 is used to heat a first material 1510 that is then provided as a first input to a set of one or more processing stages 1520. Material 1510 can be heated by SRD 1540 within an enclosed container or other container, for example. As depicted in FIG. 15, additional materials (e.g., material 1512) can be provided as additional inputs to the one or more of processing stages 1520 where materials 1510, 1512, etc. are combined to form a product 1530 as an output of the processing system. Solar energy refracted by SRD 1542 can be used to heat any combination of materials during the one or more processing stages 1520. Such materials can be heated within an enclosed container or other material, for example. Solar energy refracted by SRD 1544 can be used to heat product 1530 that is output from the one or more processing stages 1520. Product 1530 can also be heated within an enclosed container or other container, for example. Further, solar energy can be used to heat any transport lines or tubes between the starting material container(s), processing stage (s), and product container(s). Processing system 1500 may represent any suitable type of processing systems. Examples include, but are not limited to, chemical processing systems (e.g. a refinery or other chemical plant), food processing systems (e.g. a food product manufacturing facility), and waste processing systems.

Examples of the subject matter of the present disclosure are described in the following enumerated paragraphs.

A1. A solar heating system, comprising: a container configured to enclose contents within the container in a closed configuration; and a solar refraction device comprising a lens array assembly having a plurality of lens array sub-assemblies, the lens array assembly configured to refract solar energy impinging on the lens array assembly to focus refracted solar energy at a plurality of focal points positioned to heat the contents enclosed within the container in the closed configuration, each of the plurality of focal points corresponding to a corresponding lens array sub-assembly of the plurality of lens array sub-assemblies.

A2. The solar heating system of paragraph A1, wherein the container comprises an enclosed pipe configured to contain a fluid as the contents.

A3. The solar heating system of paragraph A2, wherein the enclosed pipe is configured to contain a gas as the contents.

A4. The solar heating system of paragraph A2, wherein the enclosed pipe is configured to contain a liquid as the contents.

A5. The solar heating system of paragraph A2, wherein the enclosed pipe is configured to contain a flow of the contents including one or more of a chemical reactant and a chemical product in a chemical processing system.

A6. The solar heating system of paragraph A2, wherein the enclosed pipe is a part of a sanitation system.

A7. The solar heating system of paragraph A2, wherein the enclosed pipe is a part of a food processing system.

A8. The solar heating system of any of paragraphs A1-A7, wherein the plurality of focal points are positioned at a surface of the container.

A9. The solar heating system of any of paragraphs A1-A8, further comprising one or more reflectors positioned to reflect at least a portion of the refracted solar energy toward the container.

A10. The solar heating system of any of paragraphs A1, A8 or A9, wherein the container comprises an enclosed vessel.

A11. The solar heating system of any of paragraphs A1, A8, A9, or A10, wherein the container comprises a furnace.

B1. A method for heating a container enclosing contents within the container in a closed configuration using a solar refraction device, the method comprising: refracting solar energy impinging on a lens array assembly of the solar refraction device, the lens array assembly having a plurality of lens array sub-assemblies; and focusing the refracted solar energy at a plurality of focal points upon an exterior surface of the container to heat the contents enclosed in the container, each focal point corresponding to a corresponding lens array sub-assembly of the plurality of lens array sub-assemblies.

B2. The method of paragraph B1, wherein the container comprises an enclosed pipe, and the contents comprise a fluid.

B3. The method of any of paragraphs B1-B2, wherein the container is part of a chemical processing system.

B4. The method of any of paragraphs B1-B3, further comprising reflecting, via a reflector, at least some of the refracted solar energy toward the container.

C1. A solar heating system, comprising: an enclosed pipe enclosing contents therein in a closed configuration; and a solar refraction device comprising a lens array assembly having a plurality of lens array sub-assemblies, the lens array assembly configured to refract solar energy impinging on the lens array assembly to focus refracted solar energy at a plurality of focal points to heat a fluid enclosed in the pipe, each focal point of the plurality of focal points corresponding to a corresponding lens array sub-assembly of the plurality of lens array sub-assemblies.

C2. The system of paragraph C1, wherein the enclosed pipe is in fluid communication with a turbine.

C3. The system of paragraph C2, wherein the contents comprise a fluid.

C4. The system of any of paragraphs C1-3, wherein the enclosed pipe is a part of a chemical processing plant.

C5. The system of any of paragraphs C1-C4, wherein the solar refraction device forms a canopy having a curved shape.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The invention claimed is:

1. A solar heating system, comprising:
a container configured to enclose contents within the container in a closed configuration; and
a solar refraction device comprising a lens array assembly having a plurality of lens array sub-assemblies, the lens array assembly configured to refract solar energy impinging on the lens array assembly to focus refracted solar energy at a plurality of focal points positioned to heat the contents enclosed within the container in the closed configuration, each of the plurality of focal points corresponding to a corresponding lens array sub-assembly of the plurality of lens array sub-assemblies, and wherein the solar refraction device forms a canopy having a curved shape;

the solar heating system further comprising one or more reflectors positioned to reflect at least a portion of the refracted solar energy toward the container;

wherein the solar heating system is configured to heat or melt materials inside the container;

wherein the container includes an elongated pipe segment with a round cross section;

wherein the lens array assembly is contoured to a shape of the elongated pipe segment such that the plurality of focal points are positioned within the elongated pipe segment along a length of the elongated pipe segment; and wherein a plurality of support structures connect and support the lens array assembly relative to the elongated pipe segment along the length of the elongated pipe segment.

2. The solar heating system of claim 1, wherein the container comprises an enclosed pipe configured to contain a fluid as the contents.

3. The solar heating system of claim 2, wherein the enclosed pipe is configured to contain a gas as the contents.

4. The solar heating system of claim 2, wherein the enclosed pipe is configured to contain a liquid as the contents.

5. The solar heating system of claim 2, wherein the enclosed pipe is configured to contain a flow of the contents including one or more of a chemical reactant and a chemical product in a chemical processing system.

6. The solar heating system of claim 2, wherein the enclosed pipe is a part of a sanitation system.

7. The solar heating system of claim 2, wherein the enclosed pipe is a part of a food processing system.

8. The solar heating system of claim 1, wherein the container comprises an enclosed vessel.

9. The solar heating system of claim 1, wherein the container comprises a furnace.

10. The solar heating system of claim 1, wherein the one or more reflectors are arranged partially beneath the container and reflect the portion of the refracted solar energy to an underside of the container.

11. The solar heating system of claim 1, wherein the portion of the refracted solar energy includes a first portion and a second portion of the refracted solar energy, and wherein the one or more reflectors are configured to reflect the first portion of the refracted solar energy toward the container at a first focal point to heat the container at a first location, and are configured to reflect the second portion of the refracted solar energy toward the container at a second focal point to heat the container at a second location.

12. The solar heating system of claim 1, wherein no additional reflector or refractor is positioned in between the one or more reflectors and the container.

13. The solar heating system of claim 1, wherein the one or more reflectors have a flat planar reflective surface.

14. A solar heating system, comprising:

an enclosed pipe enclosing contents therein in a closed configuration; and a solar refraction device comprising a lens array assembly having a plurality of lens array sub-assemblies, the lens array assembly configured to refract solar energy impinging on the lens array assembly to focus refracted solar energy at a plurality of focal points to heat a fluid enclosed in the pipe, each focal point of the plurality of focal points corresponding to a corresponding lens array sub-assembly of the plurality of lens array sub-assemblies, and wherein the solar refraction device forms a canopy having a curved shape;

the solar heating system further comprising one or more reflectors positioned to reflect at least a portion of the refracted solar energy toward the enclosed pipe;

wherein the solar heating system is configured to heat or melt materials inside the enclosed pipe;

wherein the container includes an elongated pipe segment with a round cross section;

wherein the lens array assembly is contoured to a shape of the elongated pipe segment such that the plurality of focal points are positioned within the elongated pipe segment along a length of the elongated pipe segment; and wherein a plurality of support structures connect and support the lens array assembly relative to the elongated pipe segment along the length of the elongated pipe segment.

15. The system of claim 14, wherein the enclosed pipe is in fluid communication with a turbine.

16. The system of claim 15, wherein the contents comprise a fluid.

17. The system of claim 14, wherein the enclosed pipe is a part of a chemical processing plant.

18. The solar heating system of claim 14, wherein the one or more reflectors are arranged partially beneath the enclosed pipe and reflect the portion of the refracted solar energy to an underside of the enclosed pipe.

19. The solar heating system of claim 14, wherein the portion of the refracted solar energy includes a first portion and a second portion of the refracted solar energy, and wherein the one or more reflectors are configured to reflect the first portion of the refracted solar energy toward the enclosed pipe at a first focal point to heat the enclosed pipe at a first location, and are configured to reflect the second portion of the refracted solar energy toward the enclosed pipe at a second focal point to heat the enclosed pipe at a second location.

20. The solar heating system of claim 14, wherein no additional reflector or refractor is positioned in between the one or more reflectors and the enclosed pipe.

* * * * *